United States Patent [19]

van der Schoot

[11] 4,222,322

[45] Sep. 16, 1980

[54] PEELING DEVICE

[75] Inventor: Peter W. C. van der Schoot, Ouderkerk, Netherlands

[73] Assignee: Goudsche Machinefabriek B.V., Gouda, Netherlands

[21] Appl. No.: 840,066

[22] Filed: Oct. 6, 1977

[30] Foreign Application Priority Data

Oct. 6, 1976 [NL] Netherlands ..................... 7611024

[51] Int. Cl.³ .............................................. A23N 7/00
[52] U.S. Cl. ........................................ 99/467; 99/479; 99/483; 99/584
[58] Field of Search .................. 99/483, 467, 469, 470, 99/471, 479, 516, 539, 540, 584, 356, 359, 371, 629–634; 21/95; 426/482; 134/134, 153; 34/12, 63, 122; 366/105, 220

[56] References Cited

U.S. PATENT DOCUMENTS

| 111,064 | 1/1871 | Hutchinson | 366/220 X |
|---|---|---|---|
| 773,029 | 10/1904 | Reaney | 366/105 |
| 1,325,847 | 12/1919 | Horst | 99/630 X |
| 2,490,112 | 12/1949 | Winters | 99/584 X |
| 2,638,137 | 5/1953 | De Back | 99/584 X |
| 3,115,915 | 12/1963 | Steber | 99/483 X |
| 4,064,794 | 12/1977 | Kunz | 99/584 X |
| 4,091,722 | 5/1978 | Kunz | 99/479 |

FOREIGN PATENT DOCUMENTS

| 2263032 | 7/1973 | Fed. Rep. of Germany | 99/584 |
|---|---|---|---|
| 7113391 | 4/1973 | Netherlands . | |
| 7303774 | 9/1974 | Netherlands . | |

*Primary Examiner*—John M. Jillions
*Attorney, Agent, or Firm*—Sprung, Felfe, Horn, Lynch & Kramer

[57] ABSTRACT

A peeling device for plants, such as potatoes, carrots, celery, red beets, Swedish turnips, apples and the like, comprising a substantially cylindrical peeling vessel with an inclined, at least partly hollow central shaft for the supply and discharge of a pressure medium, in particular steam, and having closable supply and discharge openings for the plant and the condensate. The vessel is rotatably mounted about the center line of the central shaft while the supply and discharge openings are disposed in the respective end walls.

14 Claims, 6 Drawing Figures

PEELING DEVICE

The present invention relates to a peeling device for plants, such as potatoes, carrots, celery, red beets, Swedish turnips, apples and the like, comprising a substantially cylindrical peeling vessel having an inclined, at least partly hollow, central shaft for the supply and discharge of a pressure medium, in particular steam, and having closable supply and discharge openings for the plant and the condensate.

In a prior art steam peeling machine of the above type the cylindrical vessel is stationary and rotating therein is the shaft with a transport worm disposed thereon. The plant is supplied through an opening in the cylinder surface adjacent the bottom end. In order to shut off the passage through said opening, there is disposed in front thereof a lock formed between two butterfly valves. A similar opening is disposed in the cylinder surface at the top end, with a similar lock connected thereto. In the region between the locks there constantly prevails the pressure of the pressure medium. Via the supply lock, respectively the discharge lock, each time portions of the plant to be processed, respectively of the plant processed with the steam peeling device, are supplied or discharged. The valves of the two locks adjacent the peeling vessel should necessarily move always under steam pressure, which produces considerable wear, necessitating maintenance. Because of the double lock system the steam consumption is comparatively large. With respect to the magnitude of the steam pressure to be applied, allowance should be made for the limits set by the requirements of an adequate sealing of the lock valves and the proper functioning of said valves. The wear on the bearing and sealing of the worm shaft is considerable.

It is the object of the present invention to eliminate the above and similar drawbacks of the prior art apparatus.

To this effect a peeling apparatus of the above-mentioned type has the feature that the vessel is rotatably mounted about the axis of the said central shaft while the supply and discharge openings are disposed in the respective end baffles.

When the peeling vessel is rotating the plant to be peeled is intensively contacted with the pressure medium without mechanical complications and stirred up.

It is observed that steam peeling devices having a rotating vessel at prevailing steam pressure, wherein the steam supply and discharge is effected through the rotation shaft, are known per se. In this case no cylindrical peeling vessel is concerned while there is only one opening to be closed by a valve disposed in a vessel end wall. The rotation shaft is horizontally disposed at such a height that this opening gets a top or bottom position so that via said opening the peeling vessel can be filled or emptied. The valve in this prior art apparatus is provided with a complicated opening and closing mechanism which is disposed in the interior of the peeling vessel. In case the valve is opened it may occur that considerable adhesive forces have to be overcome when tuberous plants are concerned, during which starch gelatinizes, resulting in a sticky valve by the steam pressure. Furthermore the steam discharge opening in these prior art apparatuses lies under the level of the plant in the peeling vessel so that peelings, sand, clay and water are entrained at high speed by the steam to be discharged, resulting in considerable wear, while moreover a separator device has to be disposed in the steam discharge in order to separate the steam from the peelings, the water, sand and the clay.

In a further embodiment of the present invention the vessel may be provided at the bottom side with a condensing chamber having a closable discharge opening, with the vessel and the condesning chamber being separated by a grid. The condensing chamber may have a diameter that is enlarged relative to the vessel.

There may be provided a pressure medium, in this case a steam pipe extending through the condensing chamber as far as the top of the peeling vessel. Around the end of the pipe there may be disposed a guard device ensuring that the steam outlet remains free of accidental product particles.

The peeling vessel may be rotatably mounted about its longitudinal axis in a frame that in turn is rotatably mounted in a second frame at an angle of about 90° relative to said longitudinal axis.

In the case where use is made of a peeling device having adjacent the head ends of the peeling vessel a supply, respectively a discharge opening for the product, and comprising valves for shutting off the passage through said openings, the valves may be designed as discs which are slightly axially movable but non-rotatively mounted at the central shaft which is rotatable relative to the peeling vessel. Through relative rotation of the central shaft valves relative to the peeling vessel, the supply and discharge openings can be adjusted in accordance with whether, the peeling vessel has to be filled, peeling has to take place in the peeling vessel or the peeling vessel has to be emptied. During the steam peeling—at the supply and discharge opening covered by the valves—the valve sealing is ensured by the pressure of the pressure medium in the peeling vessel which presses the valves vigorously against the packings of the end baffles disposed around the openings in the end baffles.

According to the present invention furthermore the supply and discharge opening, in the respective end baffles of the peeling vessel, may each time occupy a sectorial region of the respective end baffle, smaller than one third of the circumference. This embodiment is particularly useful when in accordance with a further feature according to the present invention, there is disposed between the end baffles at least one grid-like baffle substantially impermeable to the plant, however having a passage for the plant which can be covered by means of a valve which is likewise designed as grid-like disc and which is non-rotatively mounted at the central shaft. The openings in all above-mentioned baffles and the covering portions of the associated valve discs are so designed and circumferentially distributed that there is one relative position of shaft and vessel, wherein only the supply opening is not covered, one position wherein all openings are covered and one position wherein the discharge opening is not covered, but wherein at least the grid opening is covered. Thus it is possible in a simple manner to ensure the valve positions required during the various phases of a peeling cycle by relative rotation of the peeling vessel and central shaft valves. Through the presence of the grid-like baffle—which as a matter of fact is closest to the lower end baffle—there is formed between grid baffle and lower end baffle a space for collecting condensed water, peelings and the like in the operation period of the pressure medium. The plant cannot enter said space so that the whole plant is properly accessible to the effect of the pressure medium in the peeling vessel.

When in accordance with another feature according to the present invention it is ensured that there is moreover provided a relative position between peeling vessel and central shaft valves, wherein the discharge opening, exept for a small portion, and furthermore at least the grid opening are entirely covered, it is possible, prior to emptying the peeling vessel, to first proceed to separate discharge of the condensed water with impurities in the form of peelings, sand, clay etc. collected underneath the grid baffle at said subsequent relative position.

Since according to the present invention, in contrast to the prior art steam peeling apparatus wherein the peeling vessel rotates about a horizontal shaft, the central, hollow shaft adapted for steam supply and discharge extends through the upper baffle, the pressure medium passages between the cavity in the shaft and the vessel may be advantageously present in the upper portion of the vessel.

According to another feature of the present invention there may be preferably applied a screen underneath the said pressure medium passages, which screen is formed by a grid or plate so that the plant is not exposed to the direct pressure medium jets from the said passages and so that no undesirable impurities are entrained during the pressure medium discharge.

In a steam peeling machine according to the invention fitted with the above-mentioned further features the steam passages are thus moreover safeguarded from pollution by impurities in the form of peelings, clay, sand and the like. These will mostly collect underneath the grid baffle without—as is the case in the prior art device having a rotary peeling vessel—it being possible that plants to be processed can enter the space wherein said impurities are being collected at the bottom of said peeling vessel. In contrast to the prior art devices all the plants to be processed continue therefore to be continuously and intensively exposed to the effect of the pressure medium. Through the simple, cylindrical shape of the peeling vessel wherein only the central shaft extends, the plant to be subjected to the peeling operation is treated in a rotating peeling vessel in a plant-sparing but nevertheless intensive manner. If desired, provisions may be disposed in the peeling vessel so that during rotation the plant is additionally stirred up, such as ribs disposed along the wall or the like having a rounded contour.

According to the invention there may be provided a drive mechanism by means of which only the peeling vessel is directly driven, while for the central shaft there is provided a selectively energizable or deenergizable braking device; furthermore the valves, being contiguous to the openings through the medium pressure against their seats, are adapted to rotatively entrain the central shaft with the peeling vessel when the brake is not energized. As a result it is possible in a very simple manner to realize all valve positions required during the various phases of a peeling cycle, without using special operating mechanisms for the different valves employed, exclusively by manipulating the direct peeling vessel drive and the said braking mechanism.

Naturally, it is also possible to separately drive the central shaft valves. According to the invention there may nevertheless be provided only one driving mechanism by means of which it is possible to selectively drive only the peeling vessel or the peeling vessel together with the central shaft valves discs, or exclusively the central shaft with the valve discs—for the latter drive preferably in opposite sense of rotation. It may be advantageous to provide the latter drive possibility of the valve disc, in particular for the outlet opening, when the peeling vessel has to make for instance one or more revolutions, after the discharge opening had been opened to facilitate a more complete emptying.

An additional advantage of the apparatus according to the invention is formed by the slight quantity of pressure medium, in this case steam required per each kg of product to be processed.

It is observed that the apparatus according to the invention may also be utilized for cooking the plants.

One embodiment of the present invention will now be described, by way of example, with reference to the diagrammatic drawings, showing some details and a variant embodiment for the drive. The embodiment will be described for application during the steam peeling of potatoes, though neither the invention nor the embodiment shown is restricted thereto.

Figure 1:
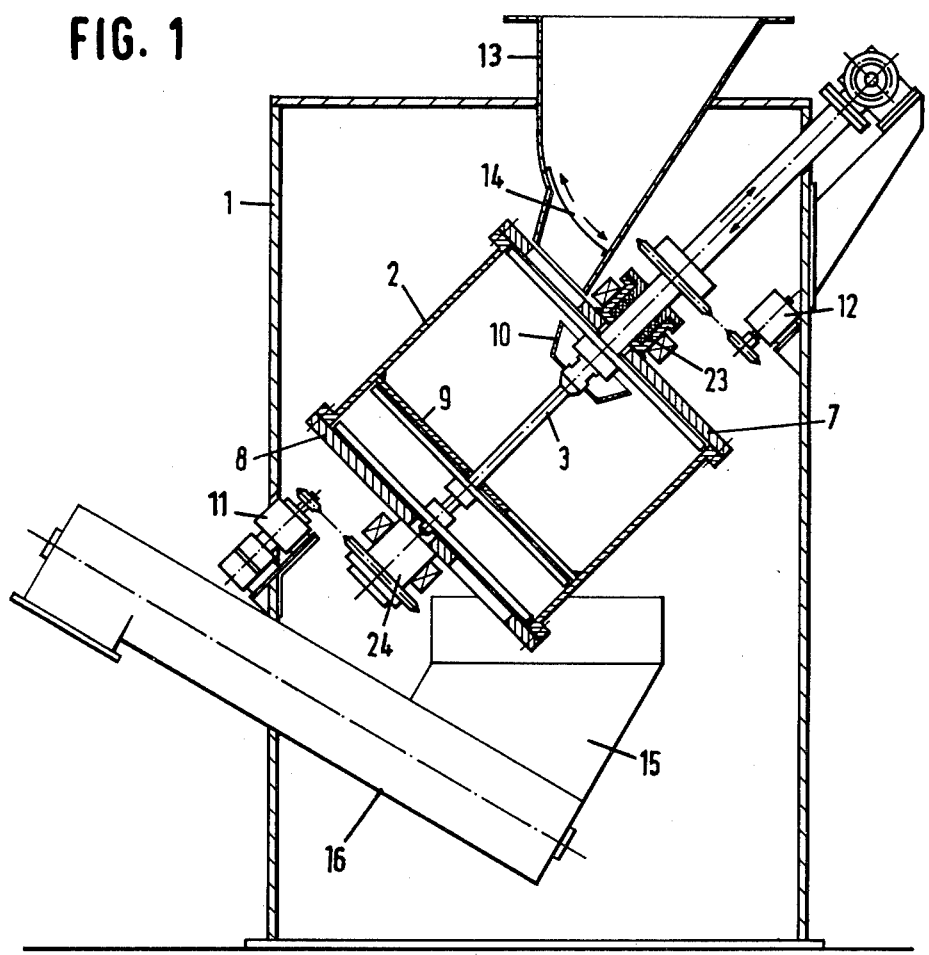
FIG. 1 is a vertical cross-sectional view of a first embodiment of the peeling apparatus.
Figure 4:
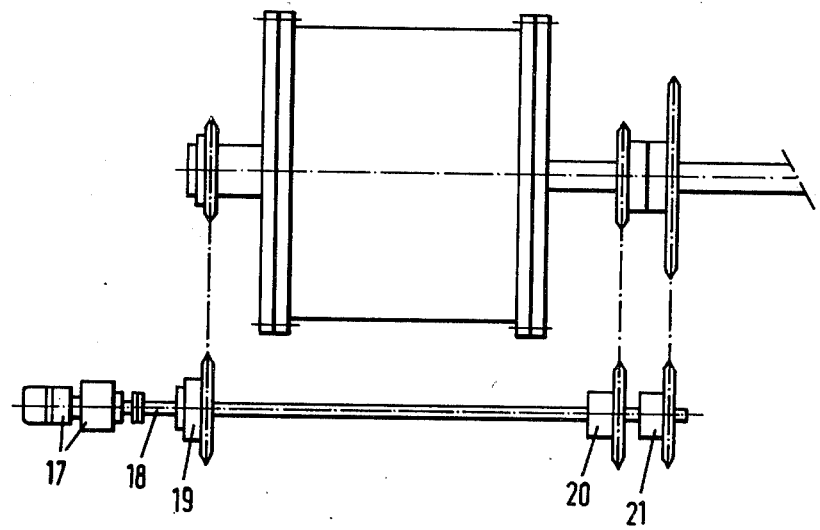
Figure 5:
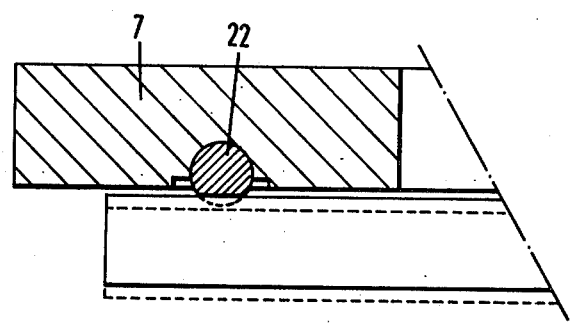
Figure 6:
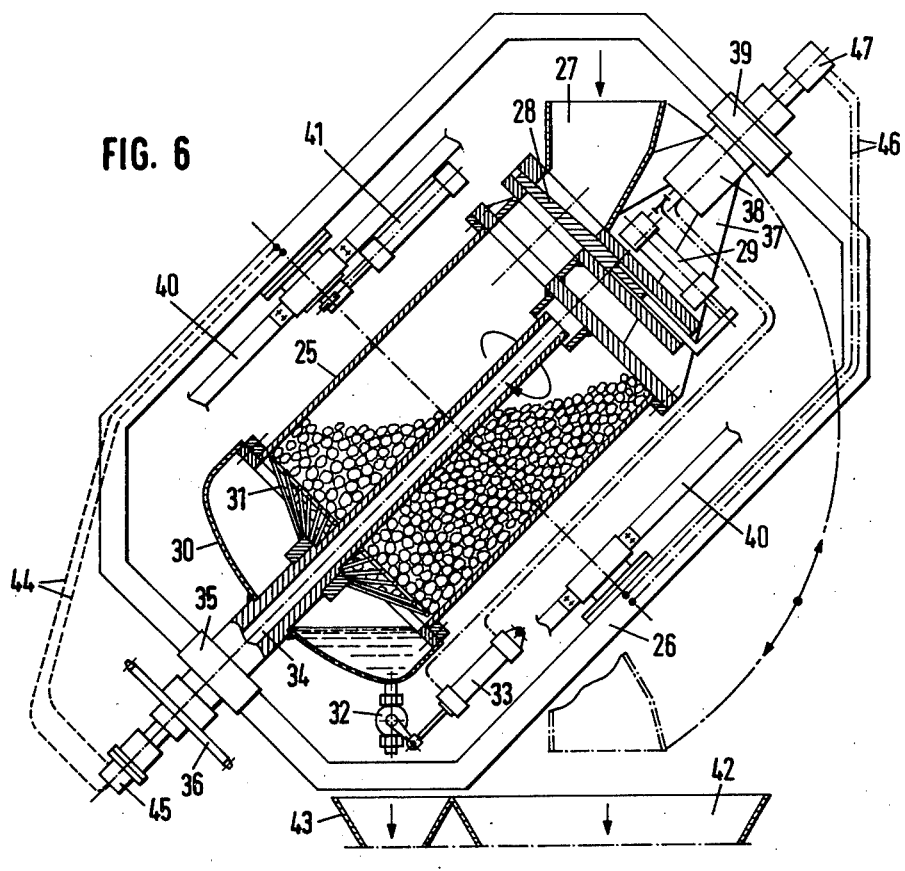

FIG. 4 diagrammatically shows a modified drive for the peeling vessel and central shaft-cum-valve discs shown in FIG. 1;

FIG. 5 is a cross-sectional view of a detail of the valve sealing at the openings in the end walls shown in FIG. 1 and FIG. 6 is a longitudinal section of a second embodiment of the peeling apparatus according to the invention.

Figure 2:
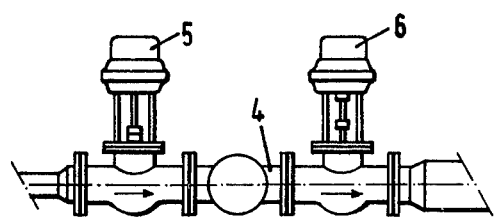
FIG. 2 shows a detail of the steam supply and discharge of the apparatus shown in FIG. 1.

As shown in the drawings, a cylindrical peeling vessel 2 disposed in a frame 1 and possibly provided at the inside with an integral moulding is provided with a partly hollow, central shaft 3 for the supply and discharge of a pressure medium, for which purpose the top end of the hollow shaft is rotatably coupled, leak-tight, to a stationary distributor 4 to which on either side there is connected a pneumatically operated steam supply valve 5, respectively steam discharge valve 6 (see FIG. 2).

The peeling vessel 2 is provided at the top with a head cover 7 fitted with a supply opening and at the bottom side with a head cover 8 fitted with a discharge opening. The covers 7, 8 are each provided with hubs 23 and 24, respectively mounted in the frame 1. In the peeling vessel 2, closer to the lower head cover than to the upper head cover, there is mounted an apertured grid 9.

Figure 3:
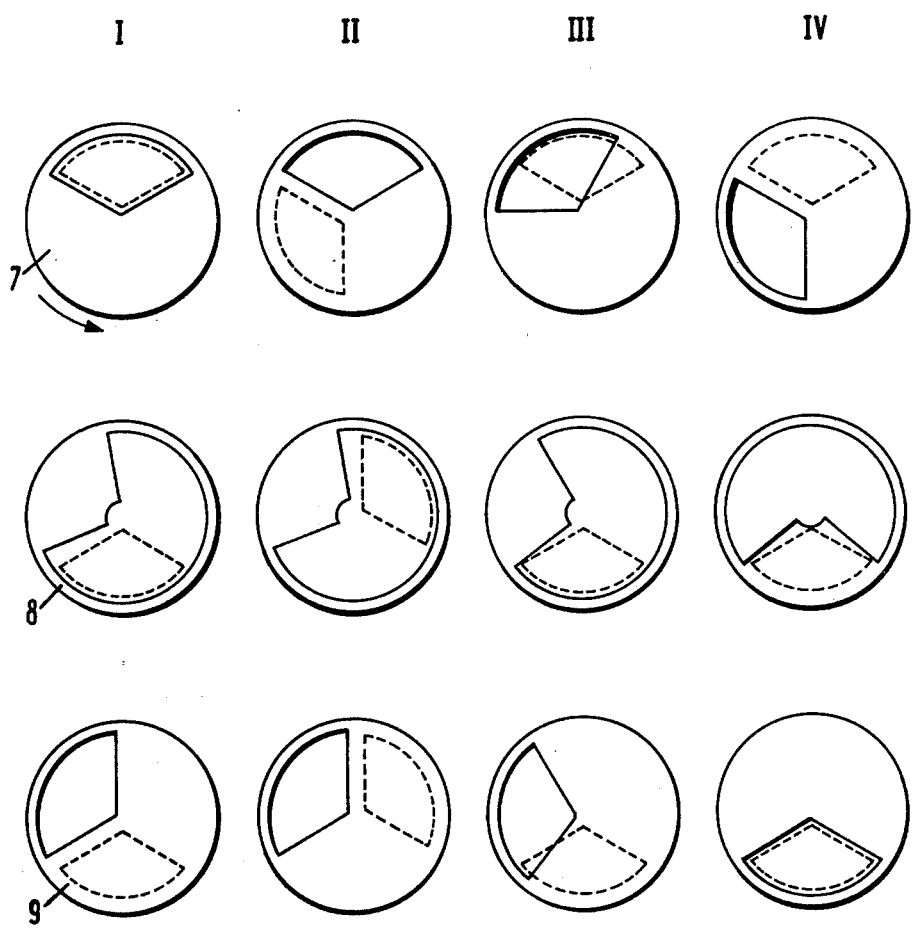
FIG. 3 is a diagram of the relative positions of the three valve discs applied in the apparatus shown in FIG. 1 relative to the openings in the end walls and in the grid-like intermediate wall during the various phases of a peeling cycle in elevational view of the valve discs and with the respective walls therebehind.

Adjacent the head covers, the grid, respectively, there are disposed on shaft 3 disc-like valves that are slightly axially movable but connected to said shaft so as to be restrained from rotation. It is observed that the valve disposed adjacent the grid is designed as a grid-like disc. Openings are applied in the discs at different angles relative to each other. Through rotation of the shaft 3 each of said openings may be selectively aligned with the opening in the associated cover or grid (see FIG. 3 showing in full lines underneath each other the head cover 7, the grid 9 and the head cover 8, viz. in four positions I, II, III and IV. In each of said positions the position of the opening of the associated valve is shown in dashed lines). The openings in the head covers, the grid and the valve discs occupy a sector smaller than ⅛ the circumference and furthermore are so circumferentially distributed that there is each time a relative position of shaft 3 and vessel 2 wherein either only the supply opening is not covered (FIG. 3, I), or all openings are covered (FIG. 3, II) or the discharge opening is not covered (FIG. 3, IV). Moreover there is another position of the peeling vessel and the valves wherein the discharge opening, except for a small portion, and furthermore at least the grid opening are entirely covered (FIG. 3, III). In this position the peelings, condensed water, the sand and the like passed through the grid may be discharged from the space between the grid and the lower head cover before the peeled product is discharged in a subsequent position.

The steam supply and discharge, as already observed, takes place via the hollow portion of shaft 3 which extends therefor from beyond the peeling vessel to slightly beyond the head cover 7 thereof, where a plurality of lateral openings are disposed in the hollow shaft. Underneath said openings there is disposed a plate 10 on the shaft which prevents the plant, upon the supply of steam, from being exposed to direct steam jets, and that, upon the discharge of steam, undesirable impurities are entrained. Underneath the peeling vessel there is present a driving mechanism 11 by means of which the peeling vessel can be rotated. Furthermore there is disposed above the peeling vessel a braking device 12 which can be selectively energized or de-energized for the rotation or non-rotation of shaft 3.

It is observed that during the admission of steam in the peeling vessel 2, during which the openings in the two head covers are closed, the upper and lower valve disc will be pressed through the medium pressure against the respective head covers so that shaft 3, upon rotation of the peeling vessel, is entrained therewith through the driving mechanism 11. As a result all valve positions, as shown in FIG. 3, during the various phases of a peeling cycle can be simply realized without separate operation devices for the different valve discs employed, exclusively through manipulation of the direct peeling vessel drive and the said braking mechanism.

As appears from FIG. 1 the supply of the product to be peeled may be effected via a funnel 13 mounted on the frame 1, which is provided with a slide 14. The discharge of condensed water, peelings, sand and the like, as well as of the peeled product, can take place via a funnel 15 communicating with a transport means 16.

In the alternative embodiment diagrammatically shown in FIG. 4, use is made of a single drive mechanism 17. On the driving shaft 18 thereof there are mounted successively a brake 19 for the drive of the peeling vessel, a brake 20 for driving the valve discs at the same speed as the peeling vessel, as well as a brake 21 for another speed of the valve discs than that of the peeling vessel, so providing a relative displacement of the valve discs with respect to the head covers, respectively the grid.

FIG. 5 finally shows a detail of the possible sealing of a valve disc relative to a head cover in order to ensure a proper sealing therebetween. Use is made therefor of a resilient ring 22 disposed in a recess of the head cover (here the head cover 7), against which ring is pressed the upper valve disc during the admission of steam in the peeling vessel.

The embodiment shown in FIG. 6 depicts a peeling vessel 25 which is rotatably mounted in a frame 26 which, for clearness' sake, is shown in a position rotated through 90°.

The peeling vessel 25 is provided at the top with an inlet funnel 27 for the material to be processed, which funnel can be shut off by a slide 28 operated by the piston rod of a cylinder 29.

At the bottom side there is connected to the peeling vessel 25 a condensing chamber 30 having a slightly larger diameter. The peeling vessel and the condensing chamber are separated by a grid 31. For discharging the condensate, sand and the like, the condensing chamber is provided with a valve 32 which is operated by the piston rod of a cylinder 33. In the depicted position there is disposed an outlet 43 underneath the valve 32.

The supply of steam to the peeling vessel takes place via a steam pipe 34 extending from the bottom through the condensing chamber as far as the top of the peeling vessel. The steam pipe is connected to the frame 26 by means of a bearing 35.

Outwardly of the frame there is disposed on the steam pipe a sprocket wheel 36 via which the peeling vessel, which at the top is rotatably mounted to the frame by means of supports 37, a tube stub 38 and a bearing 39, can be brought in rotation.

To enable discharge of the process material from the peeling vessel, it is furthermore rotatably suspended in a frame 40 disposed inwardly of the frame 26. The rotation axis of the frame 40 is perpendicular to the rotation axis of frame 26. The rotation of the frame 26, together with the peeling vessel through an angle of about 90° about the rotation axis of the frame 40 can be effected by a piston cylinder assembly 41, enabling to bring the funnel 27 in the position shown in dash-dot lines above a collector funnel 42.

The supply and discharge of steam to and from the apparatus takes place via one of the shaft stubs, not shown, by means of which the frame 40 is rotatably mounted to the frame 26, from which flexible conduits 44 extend towards a rotating connection head 45 of steam pipe 34.

Via the other shaft stubs takes place the supply and discharge of compressed air. The inlet, outlet respectively is connected through flexible conduits 46 to a rotary connection head 47 communicating with the tube stub 38 from where conduits extend towards cylinders 29 and 33.

The apparatus shown in FIG. 6 functions as follows.

At the beginning of the cycle the peeling vessel is in the position shown in the drawing while the slide 28 and valve 32 are opened.

Via the inlet funnel the product to be peeled is now supplied. Any entrained water immediately falls through the grid 31 into the condensing chamber 30 and is discharged via valve 32, so that the steaming may be initiated without water being present in the vessel, in this case the condensing chamber.

After the closure of the slide and the valve steam is introduced in the peeling vessel via one of the conduits 44, the rotary connection head 45 and the steam pipe 34, which vessel is subsequently brought in rotation by a variable-speed motor, not shown, which is coupled to the sprocket wheel 36. As a result the product to be processed is contacted on all sides with the steam, while simultaneously the condensate is discharged to the condensing chamber 30 via the grid 31.

After a pre-determined period of time the rotation is stopped and the steam is discharged via the other conduit 44. As soon as the steam pressure has dropped out, the slide 28 and the valve 32 are opened in order to discharge the condensate.

Hereafter the peeling vessel is rotated through 180° about its longitudinal axis and subsequently about its transverse axis by means of the piston-cylinder assembly 41, so that the inlet funnel 27, in the position shown in dash-dot lines, arrives above the collecting funnel 42. After this the peeling vessel is again brought in the position shown in FIG. 6 whereafter a new cycle may be initiated.

I claim:

1. A peeling apparatus for plants, such as potatoes, carrots, celery, red beets, Swedish turnips, apples and the like, comprising a longitudinally inclined substantially cylindrical peeling vessel having upper and lower end walls, an at least party hollow means for the supply and discharge of a pressure medium and having closable supply and discharge openings in the end walls of the vessel for the plants and condensate, grid means disposed in the vessel and spaced from the lower end wall and a condensing chamber between the grid means and the lower end wall having its end walls formed thereby and receptive of condensate through the grid means and wherein the grid means in conjunction with the inclination of the vessel is configured to permit passage of liquid and to prevent passage of the plants to be peeled therethrough such that they do not lie in the condensate during the steaming operation of the apparatus.

2. A peeling apparatus according to claim 1, wherein the condensing chamber has a larger diameter than that of the vessel.

3. A peeling apparatus according to claim 1, wherein the supply means includes a central shaft comprising a steam pipe extending through the condensing chamber as far as the top of the peeling vessel.

4. A peeling apparatus according to claim 3, further comprising a guard device disposed around the end of the pipe.

5. A peeling apparatus according to claim 1, wherein the peeling vessel is rotatably mounted about its longitudinal axis in a frame which, in turn, is rotatably mounted in a second frame through an angle of about 90° relative to said longitudinal axis.

6. A peeling apparatus according to claim 1, further comprising means mounting the vessel for rotation about a central shaft, and valves for shutting off the passage through said supply and discharge openings, comprising discs which are movable slightly axially but mounted so as to be restrained from rotation on the central shaft which is rotatable relative to the peeling vessel.

7. A peeling apparatus according to claim 6, characterized in that the supply and discharge openings occupy a sectorial region of the respective end wall smaller than one third of the circumference at any given time.

8. A peeling apparatus according to claim 6, wherein the grid means comprises a grid-like disc having at least one opening therein and being mounted on the central shaft and restrained against rotation and a valve disc for closing said at least one opening in the grid-like disc, the openings in the end walls and the associated covering portions of the valve discs being so configured and circumferentially distributed that there is a relative position of shaft and vessel wherein only the supply opening is not covered, a position wherein all openings are covered and a position in which the discharge opening is not covered but at least the grid opening is covered.

9. A peeling apparatus according to claim 8, wherein the configuration and location of the openings and valve discs is such that there is moreover another position wherein the discharge opening, except for a small portion, and furthermore at least the grid opening is entirely covered.

10. A peeling apparatus according to claim 8, further comprising one driving mechanism for selectively driving exclusively the peeling vessel, or the peeling vessel together with the central shaft valve discs, or exclusively the central shaft with the valve discs.

11. A peeling apparatus according to claim 6 further comprising means directly driving only the peeling vessel comprising an energizable braking mechanism operative on the central shaft, wherein the valves, through the medium pressure against their seats adjoining the openings, are adapted for entraining the central shaft together with the peeling vessel when the brake is not energized.

12. A peeling apparatus according to claim 11, further comprising a slip coupling between central shaft and peeling vessel.

13. A peeling apparatus according to claim 1, wherein the supply means comprises a central shaft and further comprising pressure medium passages between the hollow portion of the shaft and the vessel and disposed in the upper portion of the vessel.

14. A peeling apparatus according to claim 13, further comprising a screen disposed underneath the pressure medium passages in the vessel and formed of a grid or plate.

* * * * *